United States Patent [19]
Umeda et al.

[11] Patent Number: 5,452,438
[45] Date of Patent: Sep. 19, 1995

[54] IMAGE FORMING APPARATUS PROVIDED WITH SELF-DIAGNOSIS AND SELF-REPAIR SYSTEM

[75] Inventors: Yasushi Umeda, Chofu; Yasuo Motegi, Gunma; Tetsuo Tomiyama, Chiba; Hiroyuki Yoshikawa, Tokyo; Yoshiki Shimomura, Yawata, all of Japan

[73] Assignee: Mita Industrial Co., Ltd., Osaka, Japan

[21] Appl. No.: 833,685

[22] Filed: Feb. 11, 1992

[30] Foreign Application Priority Data

Feb. 20, 1991 [JP] Japan ................................. 3-025804

[51] Int. Cl.$^6$ .................................................. G06F 15/18
[52] U.S. Cl. ................................... 395/180; 395/181
[58] Field of Search ........................... 371/29.1, 15.1

[56] References Cited

U.S. PATENT DOCUMENTS

| | | | |
|---|---|---|---|
| 4,277,162 | 7/1981 | Kasahara et al. | 355/14 R |
| 4,878,072 | 10/1989 | Reinten | 346/154 |
| 4,879,577 | 11/1989 | Mabrouk et al. | 355/208 |
| 5,051,932 | 9/1991 | Inoue et al. | 364/550 |
| 5,191,638 | 3/1993 | Wakami et al. | 395/51 |
| 5,208,898 | 5/1993 | Funabashi et al. | 395/50 |
| 5,243,666 | 9/1993 | Hasegawa et al. | 382/41 |

OTHER PUBLICATIONS

Patent Abstracts of Japan, vol. 15, No. 087 (P-1173) 28 Feb. 1991 & JP-A-02 302 828 (RICOH) 14 Dec. 1990.
Patent Abstracts of Japan, vol. 15, No. 122 (P-1184) 26 Mar. 1991 & JP-A-03 010 269 (CANON) 17 Jan. 1991.
Patent Abstracts of Japan, vol. 15, No. 171 (M-1108) 30 Apr. 1991 & JP-A-03 036 136 (OMRON) 15 Feb. 1991.
Patent Abstracts of Japan, vol. 9, No. 133 (P-362) (1856) 8 Jun. 1985 & JP-A-60 015 651 (Fuji Xerox).
Translated Abstract for Laid-Open Patent No. 63-240601.
Translated Abstract for Laid-Open Patent No. 63-255701.
Umeda et al, "Model Based Diagnosis Using Qualitative Reasoning", as reprinted in Kimura and Rotstadas, editors, *Computer Applications in Production and Engineering*, Cape 1989, Tokyo, Japan, pp. 443–450 (2–5 Oct. 1989).
Benjamin Kuipers, "Qualitative Simulation", *Artificial Intelligence*, 29, pp. 289–338 (1986).
Jeff Shrager, et al, "Issues in the Pragmatics of Qualitative Modeling: Lessons Learned from a Xerographics Project", *Communications of the ACM*, vol. 30, No. 12, pp. 1036–1047 (Dec. 1987).
Nishida, an article made available to the public on Jul. 23, 1990 at a meeting of the Artificial Intelligence Society in Japan; and an English translation of sections 10.2 and 10.3 of the Nishida article.

*Primary Examiner*—Hoa T. Nguyen
*Attorney, Agent, or Firm*—Beveridge, DeGrandi, Weilacher & Young

[57] ABSTRACT

The amount of degradation, converted into a fuzzy qualitative value, is found on the basis of state data sensed by sensors 1a, 1b and 1c and degradation data. The value of a parameter changed by the amount of degradation is represented by a fuzzy qualitative value. In addition, the state data is converted into a fuzzy qualitative value, and it is judged by the value whether or not a fault exists. As a result, if a fault exists, fault diagnosis is made utilizing, as an initial value the value, of the parameter changed by the amount of degradation, and the causes of the fault are specified by comparing the result of the diagnosis with the state data converted into the fuzzy qualitative value. The causes of the fault specified are repaired by operating corresponding actuators 6a, 6b and 6c. Since the causes of the fault are specified while handling the fuzzy qualitative value, the causes of the fault can be specified more precisely. Accordingly, it is possible to achieve an image forming apparatus in which autonomy is high and repair labor is reduced.

10 Claims, 10 Drawing Sheets

F I G. 1
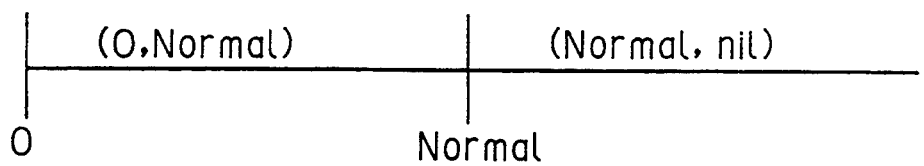
F I G. 2
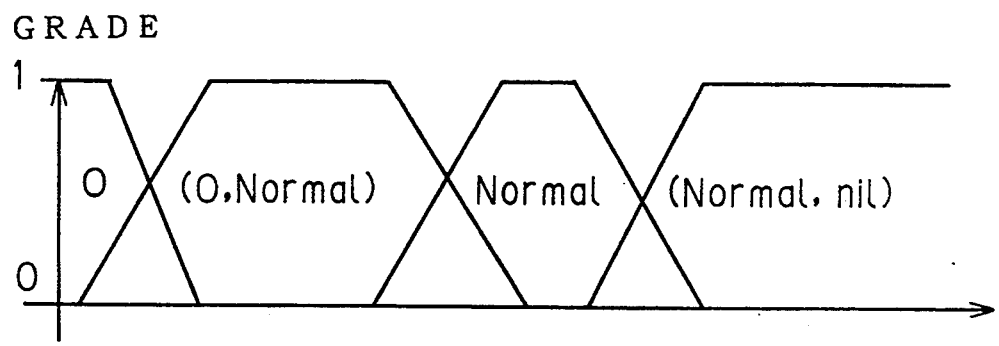

IMAGE FORMING APPARATUS PROVIDED WITH SELF-DIAGNOSIS AND SELF-REPAIR SYSTEM

BACKGROUND OF THE INVENTION

1. Field of the Invention

The present invention relates to a self-diagnosis and self-repair system, and more particularly, to a system capable of making self-diagnosis of the degraded state, the operating state and the like of an apparatus by utilizing artificial intelligence and knowledge engineering which have been studied extensively in recent years as well as adopting fuzzy inference and making self-repair as required.

2. Description of the Prior Art

In the development of precision instruments, industrial machines and the like, expert systems utilizing artificial intelligence (so-called AI) techniques have been being studied extensively in recent years for the purpose of realizing labor saving in maintenance work and long-term automatic operation. The expert systems include one for making self-diagnose to judge whether or not a fault is caused in an apparatus and making self-repair of the fault caused.

In a fault diagnosis system by the conventional expert system, such limitations have been pointed out that, for example, (A) there is no versatility in knowledge, which makes it impossible to make fault diagnosis on a variety of objects, (B) diagnosis cannot be made on unknown faults, (C) the quantity of knowledge required for fault diagnosis is increased explosively as an object becomes complicated, thus making implementation difficult, and (D) it is difficult to acquire knowledge.

More specifically, in a conventional automatic control system and fault diagnosis system, an actuator corresponding to a sensor is basically made to operate on the basis of an output of the sensor. That is, one type of automatic control and fault diagnosis has been made by a predetermined combination of a sensor and an actuator. Accordingly, a certain sensor basically corresponds to a particular actuator, and the relationship therebetween has been stationary. Therefore, the conventional system has the following disadvantages: (a) The relationship between parameters of the sensor and parameters of the actuator must be clearly expressed numerically. (b) From the reason mentioned in the above item (a), the relationship between parameters of the sensor and parameters of the actuator depends largely on an object. Accordingly, the conventional system is lacking in versatility, that is, cannot be utilized for a variety of objects. (c) The relationships between parameters of respective sensors and between parameters of respective actuators have no relation with control. Accordingly, only simple control based on the relationship between the parameters of the sensors and the parameters of the actuators which correspond to each other can be carried out, and faults which can be coped with are previously restricted and unknown faults cannot be handled. (d) From the reason mentioned in the above item (3), secondary effects exerted on parameters of other actuators which might be caused by the operation of parameters of an arbitrary actuator cannot be forecast.

In the conventional automatic control system and fault diagnosis system, therefore, only fault diagnosis based on sets respectively including independent sensors and actuators and fault repair based on the fault diagnosis have been made in such a manner that forecasting fault A is made on the basis of a set A of a sensor A and an actuator A, forecasting fault B is made on the basis of a set B of a sensor B and an actuator B, and forecasting fault C is made on the basis of a set C of a sensor C and an actuator C.

The applicant of the present application and the like have proposed as a technique associated with the present invention a new system for making self-diagnosis and/or self-repair by adopting an image forming apparatus as an objective machine so as to eliminate the disadvantages of the prior art (see U.S. patent application Ser. Nos. 07/588,191 and 07/588,177).

Qualitative inference used in the above described self-diagnosis and/or self-repair system already proposed is complete as the approach of determining the qualitative transition from a group of equations and the initial state. On the other hand, the qualitative inference has such an inevitable destiny that an ambiguous expression is not admitted as the state representation of an objective system (machine) because inference in the form of a qualitative, that is, symbolic expression is drawn. The qualitative inference is insufficient as the approach of making fault diagnosis and repair by handling information such as "ambiguous information" often seen in the maintenance activity, for example, information "this may be normal or abnormal" as the state of the machine.

Furthermore, when the fault diagnosis utilizing degradation and fault hysteresis information on respective components constituting the machine is synthesized, a fault diagnosis system and/or fault repair system having a higher degree of completion cannot be constructed unless an inference method having logic using any other method of representation added to the qualitative inference already proposed, and the approach of handling ambiguous information added thereto is considered.

The inventors of the present application have invented a self-diagnosis and self-repair system having a higher degree of completion by combining the fuzzy theory which is a theory mathematically handling ambiguity with the qualitative inference used in the above described self-diagnosis and/or self-repair system already proposed.

SUMMARY OF THE INVENTION

An object of the present invention is to provide an image forming apparatus having a system capable of developing inference admitting ambiguity from the point of view of maintenance, making self-diagnosis of the state of an apparatus using the inference and making self-repair thereof as required.

The self-diagnosis and self-repair system according to the present invention calculates as a fuzzy qualitative value the amount of degradation relative to the time elapsed after the image forming apparatus starts to be used up to the present time on the basis of state data sensed by sensor means as well as degradation data containing degradation factors and respective membership functions of the degradation factors. The value of a parameter changed by the amount of degradation calculated is converted into a fuzzy qualitative value using membership functions of the parameter, and is replaced with an expression used on qualitative data. In addition, data sensed by a plurality of sensor means is converted into a fuzzy qualitative value using the membership functions of the parameter, and it is judged on the basis of the fuzzy qualitative value whether or not a fault exists. If it is judged that a fault exists, fault diagnosis is made utilizing as an initial value the value of the parameter changed by the above described amount of degradation. The result of the diagnosis is outputted as an expression having ambiguity.

Furthermore, the causes of the fault are specified by comparing the fuzzy qualitative value obtained by the conversion from the output of the sensor means with the result obtained by the fault diagnosis. More specifically, when a plurality of fault candidates are taken up as a result of the fault diagnosis, a fault candidate which best coincides with the actual state of the apparatus is examined. Consequently, the actual fault state is outputted more accurately. A predetermined one of a plurality of actuators is operated by repair means to repair the fault.

The foregoing and other objects, features, aspects and advantages of the present invention will become more apparent from the following detailed description of the Present invention when taken in conjunction with the accompanying drawings.

BRIEF DESCRIPTION OF THE DRAWINGS

FIG. 1 is a diagram showing one example of a qualitative quantity space;

FIG. 2 is a diagram showing one example of membership functions for converging sensor information into a fuzzy qualitative value;

DESCRIPTION OF THE PREFERRED EMBODIMENTS

Fuzzy Qualitative Inference

Figure 3:
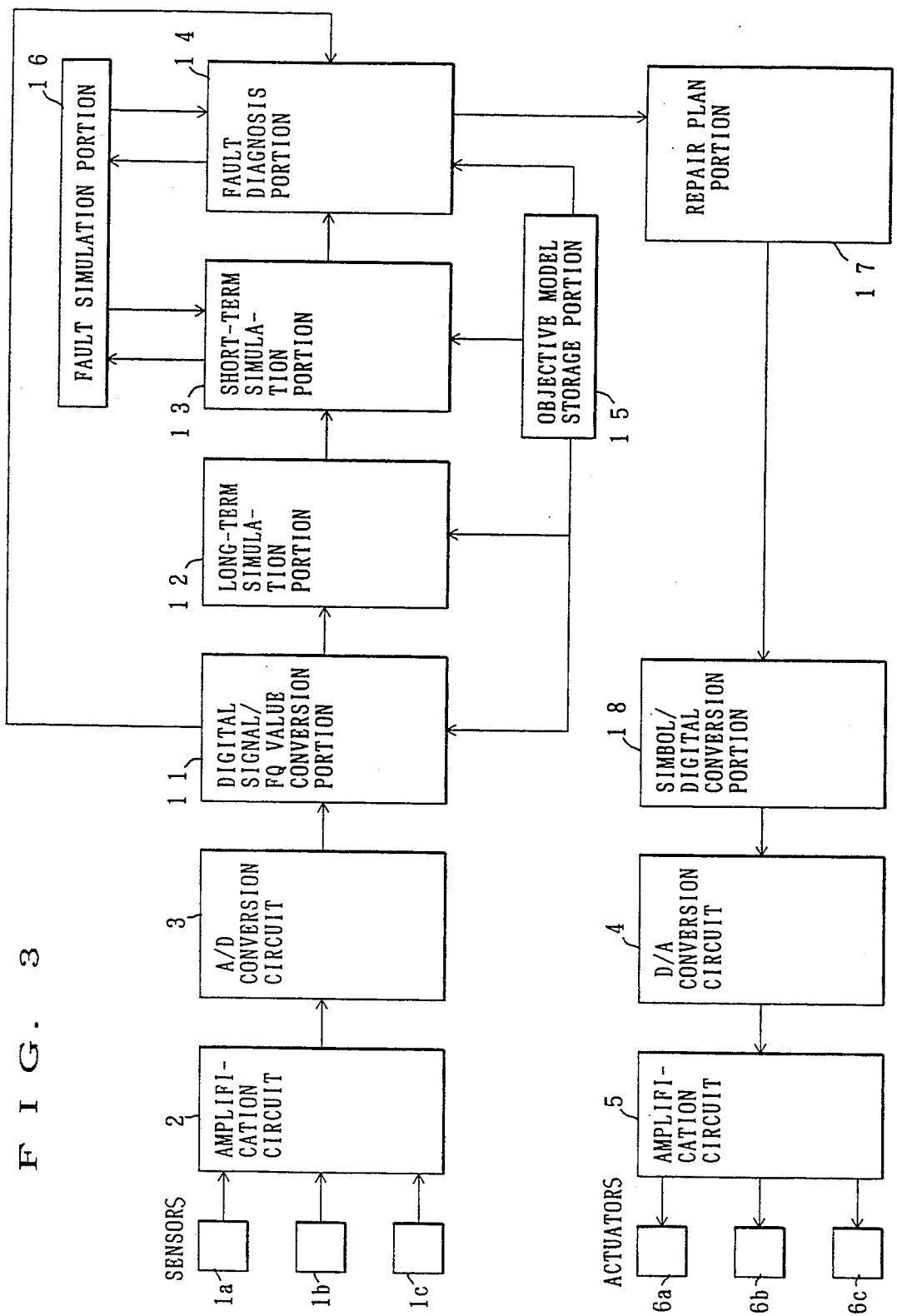
FIG. 3 is a block diagram showing the construction of one embodiment of the present invention.

Description a now made of fuzzy qualitative inference which is newly developed inference having ambiguity required for self-diagnosis.

(1) Fuzzy qualitative value

In qualitative inference used in a self-diagnosis and/or self-repair system according to the prior application of the applicant, the concepts of a quantity space and a qualitative value have been used as the approach of symbolically representing the value of a variable. The quantity space is a finite set obtained by symbolically representing a set of real numbers by a landmark which is a characteristic value having a physical meaning and a section enclosed by the landmark. Accordingly, either one of a boundary value or a section value is only taken as the qualitative value.

Considering a self-diagnosis and/or self-repair system in an ideal objective machine taken as an example, it makes sense to judge whether a certain value is a landmark value or a section value. When a quantitative value obtained by measurements is converted into a qualitative expression and inference is drawn on the basis of the expression in the actual world, it may not be appropriate that the quantitative value obtained by measurements is only alternatively converted into a landmark value or a section value. The reason for this is that "ambiguous information" is seen in the maintenance activity, as described above, so that there can actually occur the situation where the quantitative value may be a landmark value or a section value.

Therefore, the fuzzy theory is applied to the present invention.

The fuzzy theory is a theory of mathematically handling ambiguity. The expression of a set in the fuzzy theory is characterized in that an intermediate state where it is not clear whether or not a certain element belongs to the set is indicated by decimal fractions from 0.0 to 1.0 as the degree to which the element belongs to the set. The intermediate state which cannot be represented by a conventional set can be represented by using this form of expression. In the fuzzy theory, a function for defining the degree to which a certain element belongs to a certain set (grade) is referred to as a "membership function".

An expression having ambiguity added to a qualitative expression becomes possible by introducing the concept of a fuzzy set represented using this membership function. More specifically, in the present invention, the value of a variable is represented as a set of a conventional qualitative value and the degree to which it belongs to the qualitative value (grade). Such a form of expression will be referred to as a "fuzzy qualitative value".

For example, when the value of a certain variable is represented by a fuzzy qualitative value in a quantity space shown in FIG. 1, the value is expressed, for example, as follows:

(Normal:0.4, (Normal, nil):0.6)

It is possible to admit ambiguity by using this method of representation by a fuzzy qualitative value when sensor information is made use of for inference. More specifically, in a fault diagnosis system using the qualitative inference previously proposed, a certain constant range has been determined as a range of normal values. If a quantitative value obtained from a sensor is in the range, it is considered that the qualitative value is on a landmark of "normal values", to draw qualitative inference.

On the other hand, in the present invention, membership functions are used for the operation of converting a quantitative value obtained from a sensor into a qualitative expression. When membership functions are used, membership functions such as "a normal value (Normal; hereinafter abbreviated as N)", "larger than a normal value (Normal, nil; hereinafter abbreviated as N, nil)", and "smaller than a normal value (0, Normal; hereinafter abbreviated as 0, N)" are previously determined on a space of real numbers of the sensor, as shown in FIG. 2. A quantitative value obtained from the sensor is mapped on the space shown in FIG. 2, to convert the quantitative value into a qualitative expression admitting ambiguity.

(2) Operation rule of fuzzy qualitative value

An algebraic operation of a fuzzy qualitative value comprises an algebraic operation rule of qualitative inference and the calculation of grades. Description is made while giving concrete examples. Following is a concrete example:

$Zf = Xf \times Yf$
$Xf = (N:0.8, (N, nil):0.2)$
$Yf = ((0, N)0.7, N:0.3)$ and the relationship between landmarks is as follows:
(Xf, Yf, Zf) = (N, N, N)

All values which can be taken as the qualitative value of Zf are listed from the respective qualitative values of Xf and Yf (in this example, N and (N, nil) of Xf) and the relationship between the landmarks. The smaller one of grades with respect to the qualitative values of Xf and Yf is adopted as a grade with respect to the qualitative value of Zf at that time. The foregoing will be described more specifically:

| Xf | Yf | Zf | | |
|---|---|---|---|---|
| N × | (0, N) = | (0, N) | 0.8, 0.7 | = 0.7 |
| N × | N = | N | 0.8, 0.3 | = 0.3 |
| (N, nil) × | (0, N) = | (0, N) N (N, nil) | 0.2, 0.7 | = 0.2 |
| (N, nil) × | N = | (N. nil) | 0.2, 0.3 | = 0.2. |

Furthermore, when not less than two types of grades are found with respect to the qualitative value of Zf, the maximum value thereof is adopted. In the foregoing example, since two types of grades, that is, 0.7 and 0.2 are found with respect to the qualitative value (0, N) of Zf in the first and third equations, the maximum value thereof, that is, 0.7 is adopted as the grade with respect to the qualitative value (0, n) of Zf. Similarly, since two types of grades, that is, 0.3 and 0.2 are found with respect to the qualitative value N of Zf in the second and third equations, the maximum value thereof, that is, 0.3 is selected.

From the foregoing calculations, the fuzzy qualitative value of Zf is as follows:

$Zf = ((0, N):0.7, N:0.3, (N, nil):0.2)$

Furthermore, standardization is so achieved that the sum of the grades is 1. The standardization is achieved by dividing the grade with respect to each of the qualitative values by 1.2 (where $1.2 = 0.7 + 0.3 + 0.2$). As a result of the standardization, the qualitative value of Zf becomes as follows:

$Zf = ((0, N):0.58, N:0.25, (N, nil):0.17)$ (3) Inference

Inference basically uses the propagation method. This propagation method is an algorithm for sequentially propagating the value of a parameter whose value is already determined to the other parameters using the relationship between the parameters to determine parameters in the entire system.

The propagation procedure uses a method of determining an unfixed parameter out of parameters in the binomial relation or the trinomial relation using the parameters already determined and the relationship therebetween from the above described fuzzy operation rule. The specific inference method will be made clear from the concrete examples as described later.

System composition

FIG. 3 is a block diagram showing the construction of a system according to one embodiment of the present invention. This system comprises a plurality of sensors 1a, 1b and 1c installed on an objective machine (more concretely, a small-sized electrophotographic copying machine or the like) and a plurality of actuators 6a, 6b and 6c for changing the operating state or the like of the objective machine.

The plurality of sensors 1a, 1b and 1c are respectively used for sensing the change of elements of the objective machine or relevant states among the machine elements which occurs by the operation of the objective machine. Information which are taken in from the plurality of sensors 1a, 1b and 1c, respectively, are amplified by an amplification circuit 2, are converted from analog signals to digital signals by an A/D conversion circuit 3, and are applied to a digital signal/FQ value (fuzzy qualitative value) conversion portion 11. The digital signal/FQ value conversion portion 11 is a portion for converting the digital signal applied from the A/D conversion circuit 3 into a fuzzy qualitative value, that is, has the converting function for representing the digital signal by a qualitative value (for example, any one of three symbols, for example, "small", "normal", and "large") and a grade (a numerical value of 0.0 to 1.0). The signals applied from the sensors 1a, 1b and 1c are respectively converted into qualitative information represented by fuzzy qualitative values, thereby to make it easy to make an approach to fault diagnosis.

Fuzzy qualitative values of parameters required to calculate the amount of degradation of each of the components out of the fuzzy qualitative values outputted from the digital signal/FQ value conversion portion 11 are sequentially applied to a long-term simulation portion 12, a short-term simulation portion 13, and a fault diagnosis portion 14. The long-term simulation portion 12 is a portion for simulating the amount of degradation with age of each of the components constituting the objective machine. The short-term simulation portion 13 is a portion for simulating the present state of the objective machine. The fault diagnosis portion 14 is a portion for performing function evaluation using fuzzy qualitative values of parameters required to perform fault evaluation out of the fuzzy qualitative values outputted from the digital signal/FQ value conversion portion 11 to specify the fault symptom as well as derive the causes of the fault from the fault symptom. A step (fault diagnosis) for deriving the causes of the fault from the fault symptom specified in the fault diagnosis portion 14 is carried out on the basis of inference using no fuzzy inference used in the self-diagnosis and/or self-repair system disclosed in the above described prior specification of the applicant.

Furthermore, there is provided an objective model storage portion 15. The objective model storage portion 15 previously stores a "substance model" in which an objective machine is grasped from a physical point of view and is represented by parameters as a combination of a plurality of elements at a substance level, a "parameter model" in which the objective machine is represented as a combined tree of the parameters, initial values of the respective parameters, membership functions of the respective parameters, the corresponding relationship between the amount of degradation and the actual change, a reference value for fault judgment, fault candidate knowledge, and the like. These types of knowledge stored in the objective model storage portion are made use of when the digital signal/FQ value conversion portion 11, the long-term simulation portion 12, the short-term simulation portion 13, or the fault diagnosis portion 14 performs processing. In addition, there is provided a fault simulation portion 16. The fault simulation portion 16 is a portion for simulating a fault in cooperation with the short-term simulation portion 13 and the fault diagnosis portion 14.

The present embodiment and the present invention are characterized in that a system is provided with two constituent elements, that is, a long-term simulation portion and a short-term simulation portion. The two constituent elements will be described in more detail.

(1) Long-term simulation portion

A long-term simulation (hereinafter referred to as LSIM) is a simulation for taking up components associated with fault diagnosis out of the components constituting the objective machine to simulate the amount of degradation with time for each component.

Figure 4:
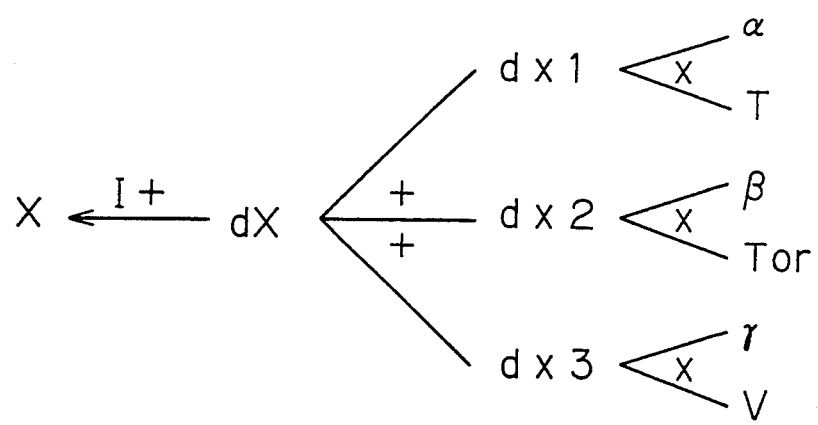
FIG. 4 is a diagram showing the relationship between degradation factor parameters and the amount of degradation.

The relationship between the amount of degradation and degradation factor parameters for estimating the amount of degradation is previously represented using a qualitative expression for each component or for each group of relevant components. For example, in the case of a gear, factors defining the amount of degradation (the amount of wear) include the time T elapsed after the gear starts to be used, a torque Tor applied in a state where the gear is used, and a peripheral speed V. The relationship between the degradation factor parameters and the degradation speed dX is shown in FIG. 4.

Figure 5:
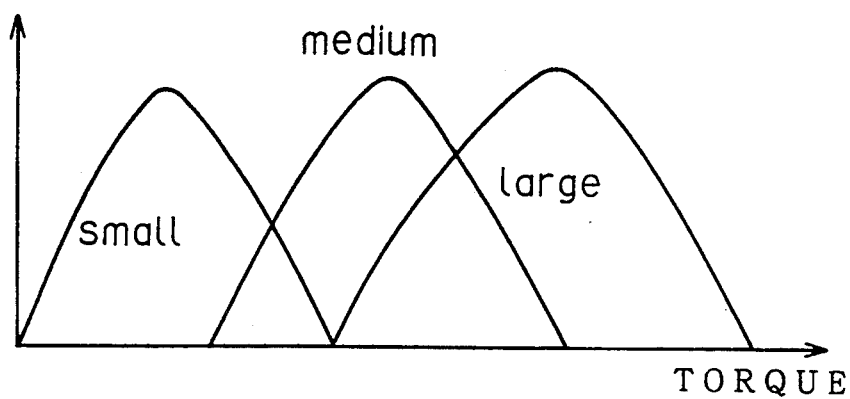
FIG. 5 is a diagram showing one example of a quantity space of the degradation factor parameter.

A quantity space of each of the degradation factor parameters, that is, T, Tor and V, constants of proportion $\alpha$, $\beta$ and $\gamma$, the degradation speed dX, and the amount of degradation X in this case is a quantity space which is not dependent on the objective machine in which the components are used but is dependent on (intrinsic to) the components. This quantity space can be represented by determining membership functions. For example, it can be represented as shown in FIG. 5 by taking as an example the torque Tor which is one of the degradation factor parameters.

Furthermore, a qualitative relationship is previously established between the values of the parameter shown in Table 1. For example, if the torque Tor is "large" and the constant of proportion $\beta$ relative to the degradation speed is "medium" the degradation speed dX2 due to the magnitude of the torque Tor is "large".

TABLE 1

| $\beta$ Tor | Relationship between values of parameter | | |
|---|---|---|---|
| | small | medium | large |
| small | 0 | small | medium |
| medium | small | medium | large |
| large | medium | large | large |

The above described quantity space and relationship between the values are previously established with respect to each of the degradation factor parameters, the constants of proportion, the degradation speed, and the amount of degradation, and are stored in the objective model storage portion 15 as knowledge which is component dependent (which is not objective machine dependent). The LSIM is made utilizing such knowledge which is component dependent for each certain constant period or at arbitrary timing to estimate the amount of degradation.

In making the LSIM, a value (quantitative value) under conditions under which the component is used in the objective machine is first mapped in the quantity space of the degradation factor parameter (see FIG. 5), thereby to convert the degradation factor parameter into a fuzzy qualitative value.

The values of the degradation factor parameter represented by the fuzzy qualitative value and the relationship between the values of the parameter are then used to find the degradation speed. In addition, the time differences in the amount of degradation within a constant period thus found are added up, thereby to find the total amount of degradation of the component (see FIG. 4). The amount of degradation finally found is obtained in the form of, for example, (middle: 0.3, large: 0.7).

However, the amount of degradation found in this LSIM is not for estimating the physical quantities on the parameter model of the objective machine. For example, even if the amount of degradation of a gear (the amount of wear of a gear) is found by the LSIM, it is not found how change occurs on the parameter model of the objective machine. The effect exerted on the objective machine by the degradation will be found from a predetermined amount of degradation and the relationship between the values of function parameters on the parameter model, as described later.

(2) Short-term simulation portion

A short-term simulation (hereinafter referred to as SSIM) is a simulation for determining the state of the present objective machine.

The state of the objective machine is represented by a set of physical quantities indicating attributes of the respective components constituting the objective machine. The SSIM is made on the parameter model in which the physical quantities are related to each other by a qualitative equation. The SSIM inference method uses the above described fuzzy qualitative inference. In addition, the propagation method is used as an algorithm for the fuzzy qualitative inference. Description is now made of the propagation procedure in this propagation method.

Inference begins in a state where the respective values of constant parameters, parameters determined by values obtained from the sensors, and parameters determined by the LSIM are determined.

In the case of the propagation, the following procedure is carried out:

(1) If two parameters have been already determined out of parameters in the trinomial relation (+, −, × and the like), the remaining one parameter is determined.

(2) If either one of parameters in the binomial relation (=) is determined, the other parameter is determined.

The foregoing propagation procedure is repeated until the values of all the parameters are determined.

As a result, the state of the entire objective machine, that is, the values of all the parameters are determined by the SSIM.

Description is now made of the inference procedure for fault diagnosis which is made in the long-term simulation portion 12, the short-term simulation portion 13, the fault diagnosis portion 14, and the fault simulation portion 16.

Figure 6:
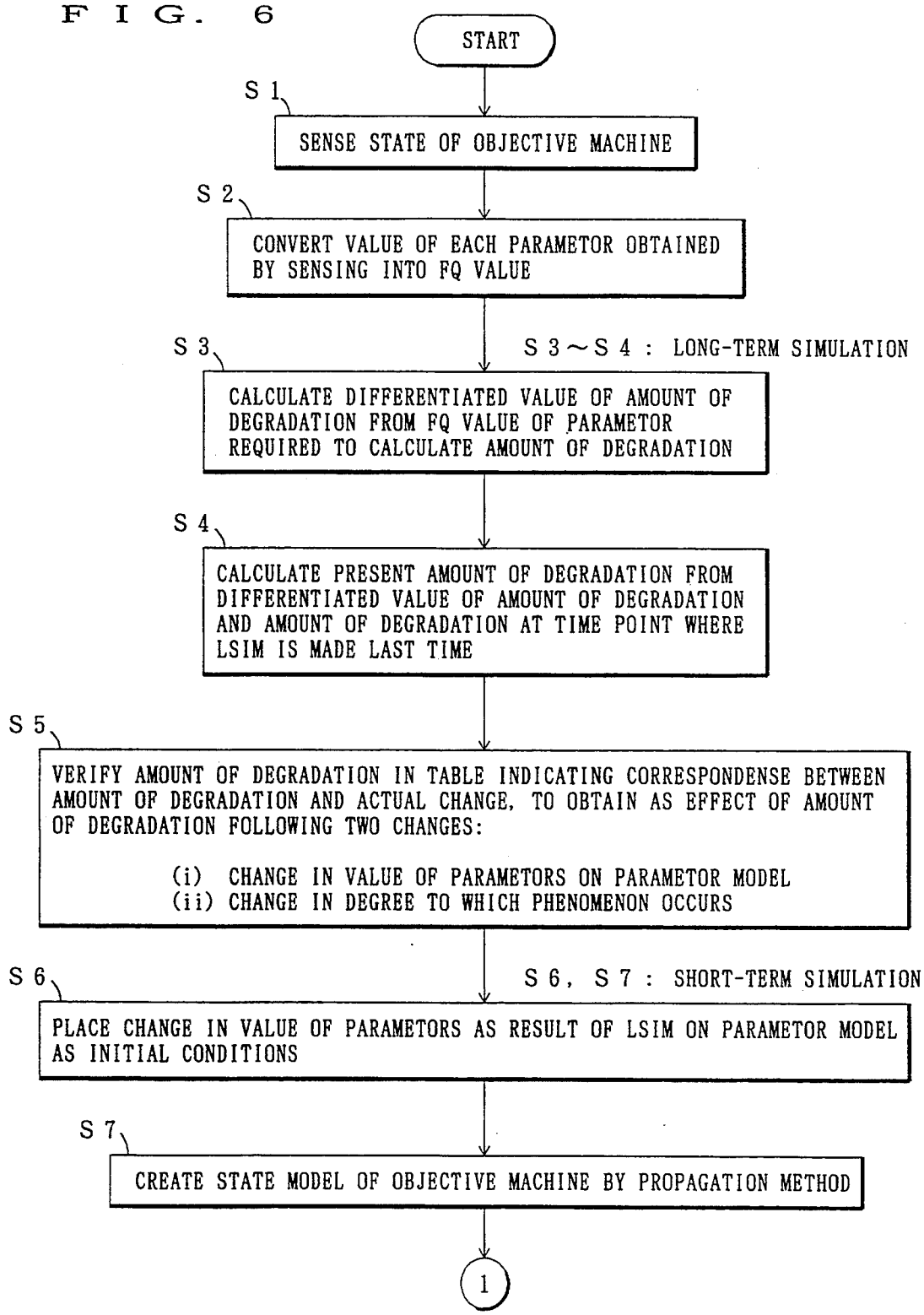
FIG. 6 is a part of a flow chart showing the inference procedure for fault diagnosis in the present embodiment.
Figure 7:
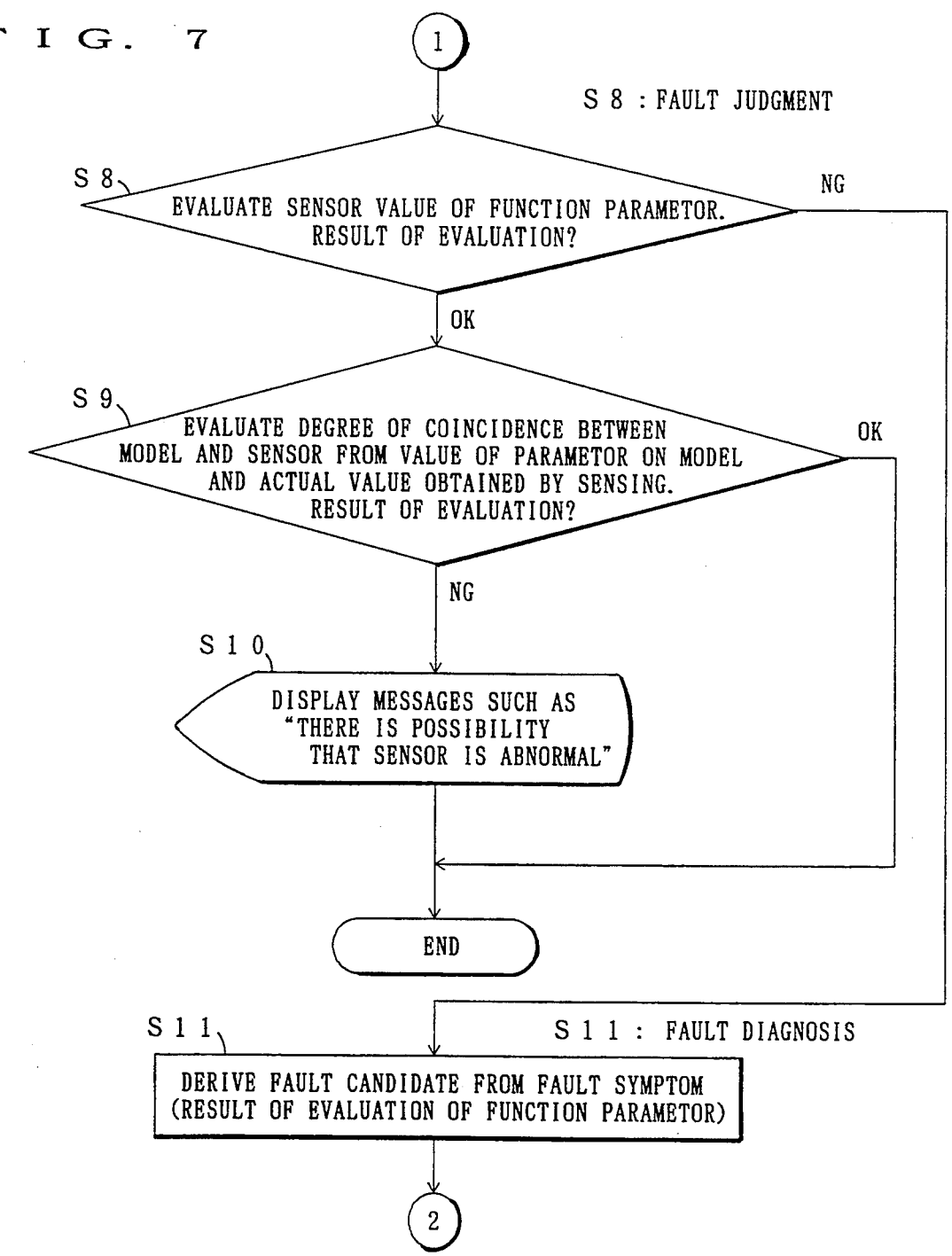
FIG. 7 is a part of a flow chart showing the inference procedure for fault diagnosis in the present embodiment.
Figure 8:
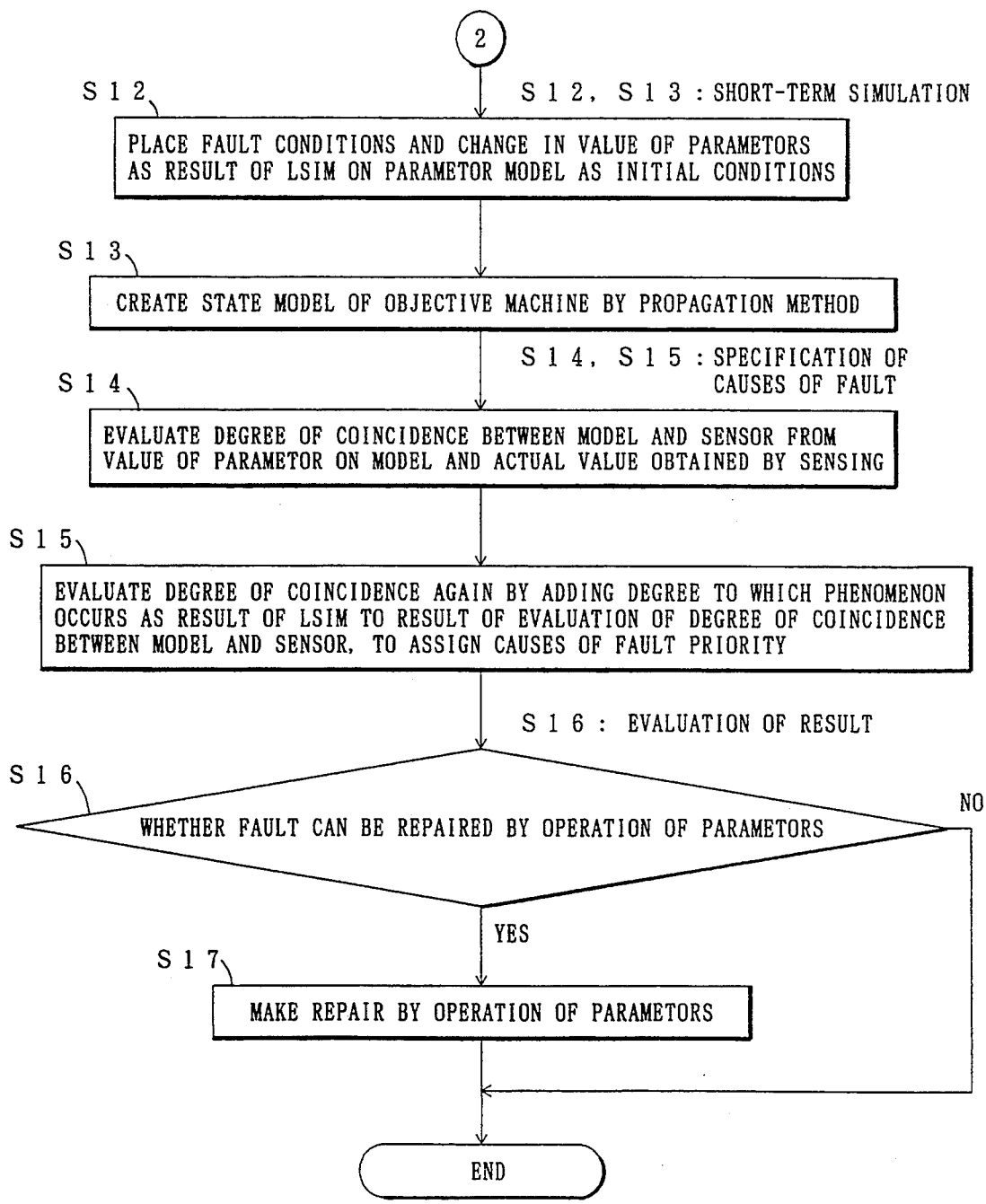
FIG. 8 is a part of a flow chart showing the inference procedure for fault diagnosis in the present embodiment.

Fault diagnosis in fuzzy qualitative inference utilizing degradation information Inference for fault diagnosis is drawn in the following procedure with reference to FIGS. 6, 7 and 8.

The state of the objective machine at the time point is previously sensed by the sensor provided for the objective machine (step S1), and the value of each of the parameters obtained by the sensing is converted into a fuzzy qualitative value (step S2). The sensing of the value of the parameter in the step S1 is achieved by, if there is provided a sensor, the sensor (for example, the quantity of light H1 of a halogen lamp is measured by an AE sensor, as described later). In addition, the time elapsed after the objective machine starts to be used is counted by, for example, a counter contained in the objective machine, and the value of the counter is read out as a quantitative value indicating the time. Alternatively, the sensing in the step S1 may be achieved by using a method in which a service man or the like manually measures the objective machine and inputs the measured value into a system if no sensor and counter are contained in the objective machine.

(1) LSIM

The LSIM is made with respect to a predetermined one of the components constituting the objective machine using as input information quantitative information obtained as a designed value and the time elapsed after the component starts to be used, to estimate the amount of degradation of the component.

A differentiated value dXX of the amount of degradation XX is then calculated from fuzzy qualitative values of parameters required to calculate the amount of degradation out of the parameters converted into fuzzy qualitative values (step S3), and the present amount of degradation XXn is calculated from the differentiated value dXX of the amount of degradation and the amount of degradation XXn−1 found at the time point where the LSIM is made last time (step S4), that is, the following calculation is done:

$XXn = XXn - 1 + dXX$ (2) Conversion of the amount of degradation into effect on the component.

The amount of degradation obtained as a result of the LSIM is converted into the effect on the component (step S5).

The conversion is made by verifying the present amount of degradation XXn calculated in the step S4 in the table showing correspondence between the amount of degradation and the actual change. The table showing correspondence between the amount of degradation and the actual change is as Table 3 in the concrete example as described later.

As a result of the conversion, the following two changes are obtained as the effect exerted on the component by the degradation:

(i) Change in value of parameters on parameter model (ii) Change in degree to which phenomenon occurs Although the above described two changes are found as the effect exerted on the component by the degradation, only the change in value of parameters on the parameter model, for example, may be found.

(3) SSIM

The simulation is made utilizing as the initial conditions the change in value of parameters obtained as the effect exerted on the component found in the foregoing item (2), to determine the values of parameters in the entire objective machine after an elapse of time.

More specifically, the value of a predetermined parameter obtained by the LSIM is placed on the parameter model (step S6), and is propagated to the other parameters on the parameter model by the propagation method so that the values of all the parameters in the objective machine are determined, to create a state model of the objective machine (step S7).

(4) Fault judgment

It is then judged by viewing the sensor value of a function parameter out of the sensor values previously converted into fuzzy qualitative values in the steps S1 and S2 whether or not a fault occurs (step S8).

The sensor value of the function parameter is evaluated by comparison with a reference value for fault judgment previously stored in the objective model storage portion 15. If it is judged that the sensor value of the function parameter is normal, the program proceeds to the step S9. In the step S9, the value of the parameter on the parameter model found in the step S7 and the actual value of the parameter sensed or inputted in the step S1 are compared with each other, to determine the degree of coincidence between the parameter model and the actual state of the objective machine.

As a result of the evaluation of the degree of coincidence in the step S9, processing is terminated when both coincide with each other, while the objective machine continues to be operated by giving precedence to the judgment in the step S8 that the sensor value of the function parameter is normal. However, the value on the model and the sensor value does not coincide with each other so that there is a possibility that a fault occurs. Accordingly, a display device or the like is caused to display a message (step S10). The message is displayed in various forms. For example, when the sensor value of the function parameter is normal and the value on the parameter model and the sensor value do not coincide with each other, it is considered that the sensor for measuring the function parameter fails, so that a message such as "there is a possibility that the sensor is abnormal" is displayed.

(5) Fault diagnosis

When it is judged in the above described item (4) that a fault occurs, a fault candidate is derived from the fault symptom (step S11).

A plurality of fault candidates are previously stored in the objective model storage portion 15 (see FIG. 3). The value of the function parameter is traced on the parameter model, to select and derive the corresponding fault candidate from the plurality of fault candidates previously stored. Alternatively, the fault candidate may be determined by inference (non-fuzzy inference using no fuzzy theory) described in the above described prior application of the applicant.

(6) SSIM

The SSIM is made with respect to each of the fault candidates derived in the step S11, to create a fault model.

More specifically, the fault conditions and the value of the parameter obtained as a result of the LSIM are placed as initial conditions on the parameter model with respect to each of the fault candidates (step S12), and the value of the parameter is traced on the parameter model by the propagation method, to create a state model of the objective machine (step S13).

In the above described manner, a fault model is created.

(7) Specification of causes of fault

The causes of the fault are assigned priority and are narrowed down from sensor information, the degree to which a phenomenon occurs found in the item (2), and the like.

More specifically, the degree of coincidence between the model and the sensor is evaluated on the basis of the value of the parameter on the state model and the actual value of the parameter sensed or inputted in the step S1 (step S14), and the degree of coincidence is evaluated again by adding the degree to which a phenomenon occurs which is obtained as a result of the LSIM to the result of the evaluation of the degree of coincidence, to assign the causes of the fault priority (step S15).

Meanwhile, a simple method of specifying the causes of the fault by only the degree of coincidence between the value of the parameter on the model and the actual sensor value of the parameter which is evaluated in the step S14 by omitting the processing in the step S15 may be used.

The fault diagnosis is completed in the foregoing inference procedure. In addition, at the time of the completion of the fault diagnosis, the work of adding and/or repairing fault hysteresis information may be performed. Thereafter, it is judged by the operation of parameters whether or not the fault can be repaired (step S16). The fault is repaired when it can be repaired by the operation of parameters (step S17), while the processing is terminated without any modification because the fault cannot be repaired when it cannot be repaired by the operation of parameters, for example, when a halogen lamp is cut off in an electrophotographic copying machine. The repair operation in the step S17 is performed in a repair plan portion 17 as described below.

Returning to FIG. 3, the remaining composition blocks will be described.

The repair plan portion 17 is a composition portion for inferring a repair plan for repairing, when a fault exists, the fault as well as deriving repair work. The inference of the repair plan and the derivation of the repair work make use of non-fuzzy qualitative inference using no fuzzy theory, similarly to the inference in the self-diagnosis and/or self-repair system already proposed.

The repair work outputted from the repair plan portion 17 is converted into a digital signal in a symbol-to-digital signal conversion portion 18. The digital signal converted is converted into an analog signal in a D/A conversion circuit 4, is amplified in an amplification circuit 5, and is applied to a plurality of actuators 6a, 6b and 6c so that the actuators 6a, 6b and 6c are selectively operated, thereby to perform the repair work.

DESCRIPTION BY TAKING AN EXAMPLE SPECIFIC OBJECTIVE MACHINE

Construction and State of a Specific Objective Machine

Description is now made by taking as an example a case where this system is applied to an image forming apparatus serving as a specific objective machine and more specifically, to a small-sized electrophotographic copying machine.

Figure 9:
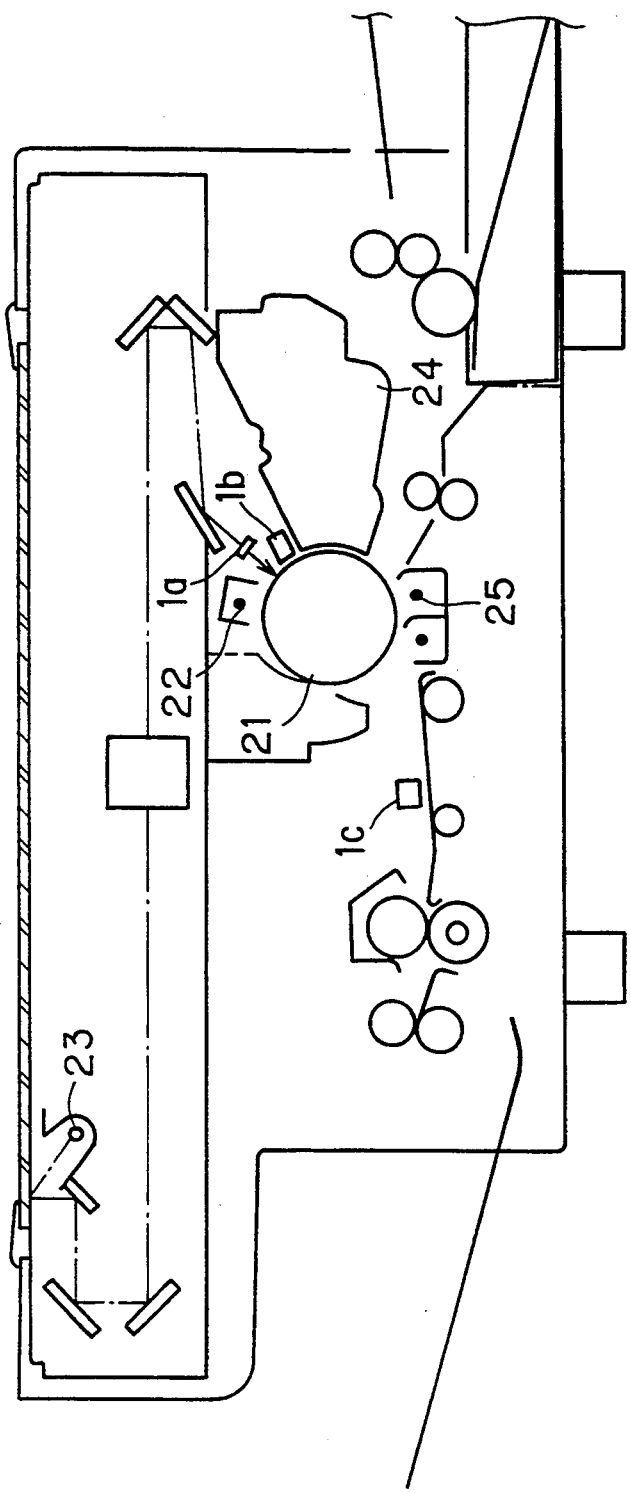
FIG. 9 is an illustration showing a small-sized electrophotographic copying machine serving as a specific objective machine.

FIG. 9 is an illustration showing a small-sized electrophotographic copying machine serving as a specific objective machine. In FIG. 9, reference numeral 21 designates a photosensitive drum, reference numeral 22 designates a principal electrostatic charger, reference numeral 23 designates a halogen lamp for copy illumination, reference numeral 24 designates a developing device, and reference numeral 25 designates a transfer charger.

This specific objective machine is provided with, for example, three sensors $1a$, $1b$ and $1c$. More specifically, the sensor $1a$ is an AE sensor for measuring the quantity of light incident on the photosensitive drum 21, the sensor $1b$ is a surface potential sensor for measuring a surface potential of the photosensitive drum 21, and the sensor $1c$ is a densitometer for measuring the density of a picture image copied on paper.

Furthermore, three types of actuators are provided, which are not shown in FIG. 9. That is, three volumes, that is, a principal charge volume VR1 for changing a principal charge voltage of the photosensitive drum 21, a lamp volume AVR for controlling the quantity of light of the halogen lamp 23, and a transfer volume VR2 for controlling a transfer voltage between the photosensitive drum 21 and copy paper are provided as the actuators.

Meanwhile, when the electrophotographic copying machine shown in FIG. 9 is looked at from a physical point of view, the electrophotographic copying machine is expressed as a combination of a plurality of elements at a substance level, and behaviors and attributes of the respective elements as well as the combinational relationship among the respective elements are expressed qualitatively using parameters, as shown in Table 2. The form of expression will be referred to as a "substance model".

Figure 10:
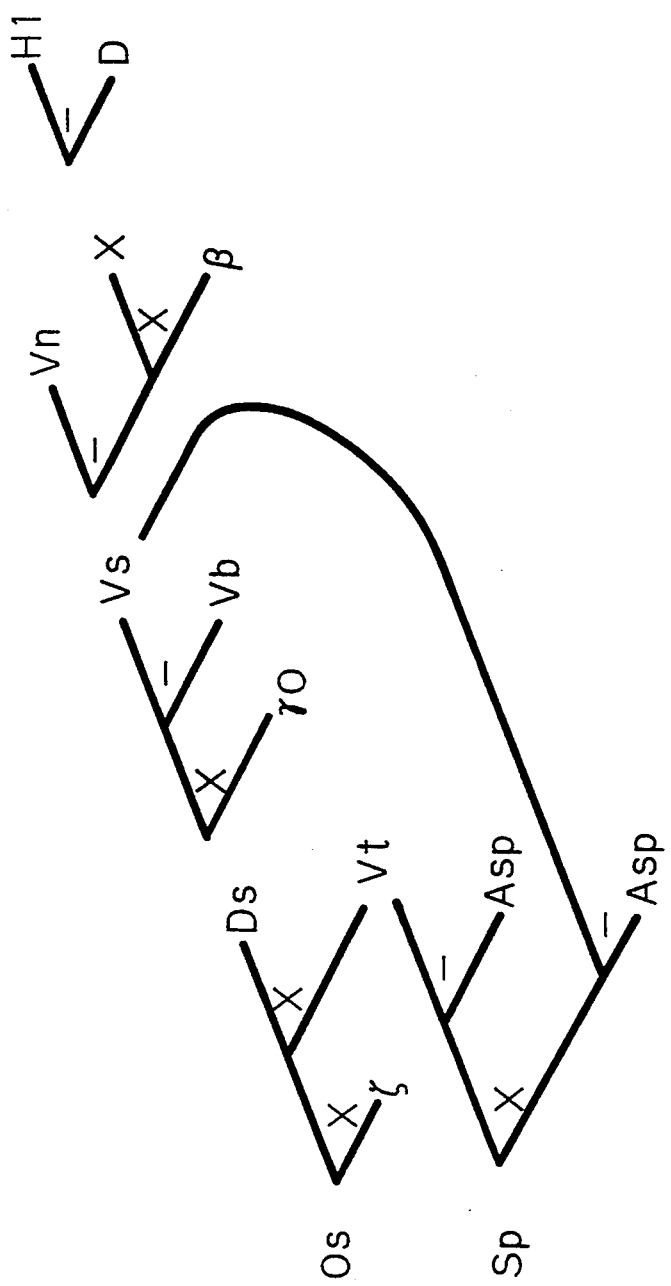
FIG. 10 is a diagram showing a parameter model of the electrophotographic copying machine according to the present embodiment.

Furthermore, the expression of FIG. 10 in which the substance model is abstracted and shown as a combined tree of the parameters will be referred to as a "parameter mode 1".

The "substance model" and the "parameter model" are referred to as an "objective model" correctively. The "objective model" is qualitative data common to image forming apparatuses which is also made use of for fault repair as described later. The respective contents of the substance model and the parameter model are stored in the objective model storage portion 15 (see FIG. 3).

TABLE 2

Substance Model

Exposure portion: $X = H1 - D$
- $X$     logarithm of original reflected quantity of light
- $H1$    logarithm of halogen lamp output quantity of light
- $D$     optical density of copy Photosensitive portion: $Vs = Vn - \beta X$
- $Vs$   surface potential after exposure
- $Vn$   surface potential after principal charge
- $\beta$    sensitivity of photosensitive substance Development portion: $Ds = \gamma (Vs - Vb)$ TABLE 2-continued

| Substance Model | |
|---|---|
| Ds | toner density on drum |
| γ0 | toner density |
| Vb | bias voltage |
| Output portion: Os = ζ · Vt · Ds | |
| Os | toner density on output paper |
| ζ | sensitivity of paper |
| Vt | transfer voltage |
| Separation portion: Sp = (Vt − Asp) · (Vs − Asp) | |
| Sp | adsorbing force between drum and paper |
| Asp | amplitude of separating AC voltage |

Figure 11:
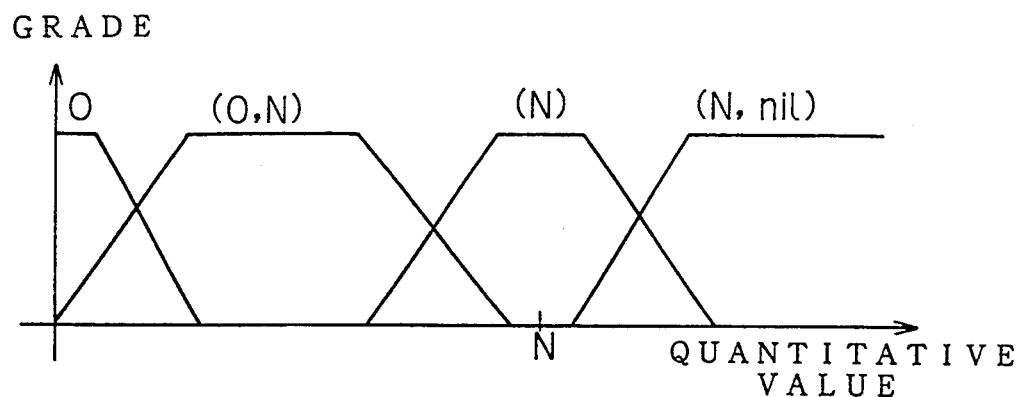
FIG. 11 is a diagram showing an example of a qualitative fuzzy quantity space of a parameter.

In the substance model shown in Table 2 or the parameter model shown in FIG. 10, parameters H1, D, Vn, β, Vb, γ0, ζ and Asp basic to the construction of this objective machine, sensor parameters X, Vs and Os obtained from the sensors, and parameters which may be degraded have respectively qualitative fuzzy quantity spaces shown in FIG. 11. This qualitative fuzzy quantity space can be arbitrarily created, and is previously created by determining membership functions for each parameter and stored in the objective model storage portion 15.

Figure 12:
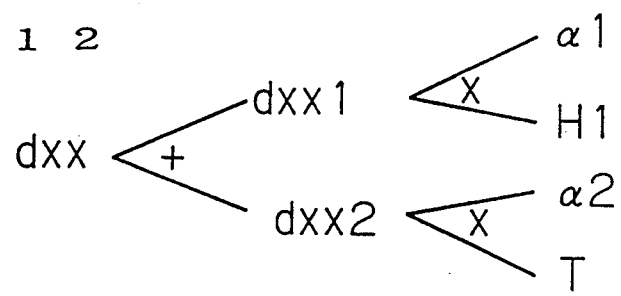
FIG. 12 is a diagram showing one example of a degradation model.
Figure 13:
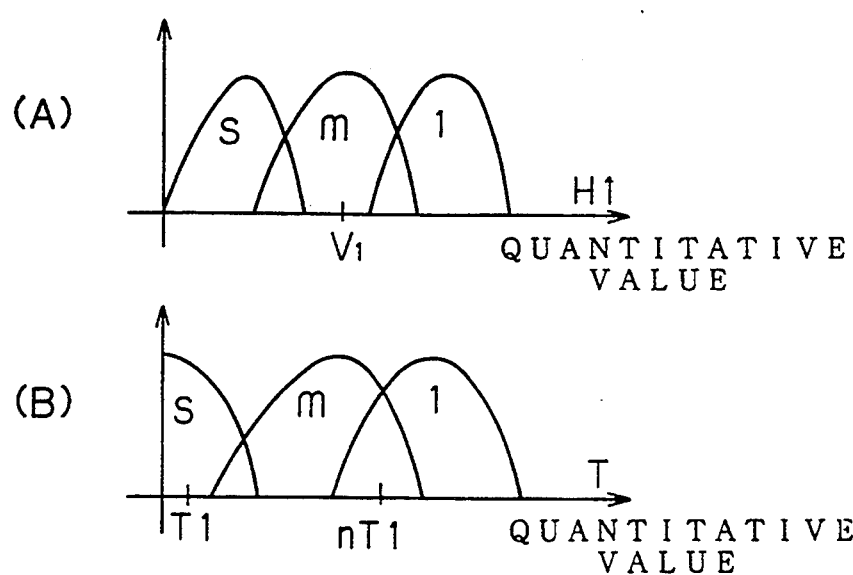
FIG. 13 is a diagram showing a qualitative fuzzy quantity space of each of parameters on the degradation model.

Furthermore, a degradation model intrinsic to a predetermined component out of the components constituting the electrophotographic copying machine according to the present embodiment is constructed. In the present embodiment, description is made considering that only an exposure portion is degraded for simplification. FIG. 12 shows a degradation model, and FIG. 13 shows a qualitative fuzzy quantity space on the degradation model of each of the parameters. In addition, Table 3 shows the corresponding relationship between the amount of degradation XX and the actual change, and Table 4 (A) and (B) show an operation rule.

TABLE 3

| | Corresponding relationship between amount of degradation XX and actual change | | |
|---|---|---|---|
| XX | s | m | l |
| H1 | N 1.0 | (0, N) 0.05 | (0, N) 0.1 |
| | | N 0.95 | N 0.9 |
| p (H1Cut) | 0.9 | 1.1 | 1.3 |

TABLE 4

| (A) | | | | (B) | | | |
|---|---|---|---|---|---|---|---|
| × | s | m | l | + | s | m | l |
| s | 0 | s | m | s | 0 | s | m |
| m | s | m | l | m | m | m | l |
| l | m | l | l | l | l | l | l |

Although in the tables 3 and 4, only s, m and l are used as values for simplification, the number of values is not limited to three. For example, four values may be used. The values can be arbitrarily extended.

Furthermore, p (H1Cut) in the above described table 3 indicates the degree p to which there occurs such a phenomenon that the halogen lamp is cut off (H1Cut). In addition, the degree p to which a phenomenon occurs is taken as 1.0 when it is not changed with time, which is not shown in the table 3. For example, in the present embodiment, the degree p to which there occurs such a phenomenon that the halogen lamp is faulty (H1Out) is 1.0.

In the LSIM, the degradation is found as the integration of the amount used and the time after the objective machine starts to be used. Accordingly, the LSIM is made once a month, for example, to make it possible to find the amount of degradation XXn for this month in the following equation from the amount of degradation XXn−1 at the time point where the LSIM is made last month and the differentiated value dXX of the amount of degradation found from FIG. 12:

$XXn = XXn - 1 + dXX$.

Description is now made by giving several examples utilizing the foregoing description as a premise.

EXAMPLE 1

Example in which machine is normal one month (T1) after it is new

The values obtained by the above described sensors 1a, 1b and 1c are previously converted into fuzzy qualitative values.

More specifically, the quantity of light of the sensor 1a measured using a reference white document is used as the value of a parameter H1, and the quantity of light of the sensor 1a measured using a document having a predetermined density is used as the value of a parameter X. In addition, a surface potential Vs after exposure and a toner density Os on output paper are respectively measured by the sensors 1b and 1c.

Furthermore, time information at the time point where the sensor values of the above described respective parameters are measured is used as T.

H1=V1 and T=T1 are found from the measurements of the above described values of the parameters and are mapped on FIG. 13, to find the following fuzzy qualitative values.

H1=(m:1.0)
T=(s:1.0)

Furthermore, quantitative values of X, Vs and Os obtained from the measurements of the above described values of the parameters are respectively mapped in qualitative fuzzy quantity spaces intrinsic thereto, as shown in FIG. 11, to obtain the following sensor values of the parameters:

X=((0, N):0.1, N:0.9)
Vs=(N:1.0)
Os=((0, N):0.1, N:0.9).

(1) Forecast of present degraded state by LSIM
The initial conditions are set as follows:
XX=(0:1.0).
The following coefficients are previously set:
α1=(s:1.0),
α2=(m:1.0).
The coefficients α1 and α2 are arbitrary values and are set in accordance with the degree of the effect.

Furthermore, the foregoing values are used as the values of the parameters H1 and T:
H1=(m:1.0)
T=(s:1.0).

From FIG. 13 and the tables 4 (A) and (B), the following results are obtained:

| | | |
|---|---|---|
| dXX1 | = | (s: 1.0) |
| dXX2 | = | (s: 1.0) |
| dXX | = | (s: 1.0) |
| ∴ XX | = | XXn − 1 + dXX |
| | = | (0: 1.0) + (s: 1.0) |
| | = | (s: 1.0). |

(2) Examination of effect of amount of degradation
The amount of degradation XX found in the foregoing item (1) is applied to the table 3, to obtain the following results:

H1=(N:1.0)
p (H1Cut)=0.9

This proves that the degree to which there occurs such a phenomenon that the halogen lamp is cut off (H1Cut) is 0.9.

(3) Inference of the present state of entire machine using the result of LSIM by SSIM The SSIM is made on the basis of the result of the foregoing item (2) (H1=(N:1.0)) and the initial conditions (in this case, the amount of degradation is not calculated with respect to parameters other than H1 and thus, the remaining parameters are all (N:1.0)). As a result of the SSIM, the values of all the parameters are (N:1.0) as described below:

H1=(N:1.0)  $\gamma$0=(N:1.0)
D=(N:1.0)   Vt=(N:1.0)
$\beta$=(N:1.0)   $\zeta$=(N:1.0)
Vn=(N:1.0)  Asp=(N:1.0)
Vb=(N:1.0).

(4) Fault judgment

The following knowledge is used as the reference for fault judgment. This knowledge is previously stored in the objective model storage portion 15 (see FIG. 3).

(a) Fault evaluation of machine
N value≧0.5
→normal
→compare the degree of coincidence between the value on the model and the measured value
N value >0.5
→abnormal
→fault diagnosis (b) Comparison between value on model and measured value
the degree of coincidence between the value on the model and the measured value ≧0.5
→no fault
the degree of coincidence between the value on the model and the measured value >0.5
→display message such as "there is a possibility that the sensor is abnormal".

In the present embodiment, (a) the function evaluation of the machine is first carried out. In this case, comparison may be made with respect to Os. Accordingly, comparison is made using Os=((0, N):0.1, N:0.9) obtained by converting the measured value of Os into a fuzzy qualitative value. In this case, the value of N is 0.9. Accordingly, N ≧0.5, so that the result of (a) the function evaluation becomes normal.

Then, (b) comparison is made between the value on the model and the measured value.

Comparison is made between each of the sensor values and the value on the model obtained as the result of the above described item (3), to find the degree of coincidence therebetween from the following conditions:

|    |        | sensor value | model value | min value |
|----|--------|--------------|-------------|-----------|
| x  | (0, N) | 0.1          | 0           | 0         |
|    | N      | 0.9          | 1.0         | 0.9       |
|    |        |              |             | max 0.9   |
| Vs | N      | 1.0          | 1.0         | 1.0       |
|    |        |              |             | max 1.0   |
| Os | (0, N) | 0.1          | 0           | 0         |
|    | N      | 0.9          | 1.0         | 0.9       |
|    |        |              |             | max 0.9.  |

Furthermore, the degree of coincidence in the entire machine is as follows:
the degree of coincidence in the entire machine
=the average of the degrees of coincidence between the values of the respective sensors and the value on the model
=(0.9+1.0+0.9)/3=0.93.

Meanwhile, the degree of coincidence in the entire machine may be found under more strict conditions by taking not the average value but the minimum value of the degrees of coincidence between the values of the respective sensors and the value on the model.

When the above described reference for fault judgment (b) is applied, the average of the degrees of coincidence exceeds 0.5, so that it is judged that the result is normal. More specifically, the results of both (a) and (b) are normal, so that the objective machine can continue to be used. In the above described embodiment, when the result of (a) the function evaluation of the machine is normal and the result of (b) the comparison between the value on the model and the measured value is abnormal (a case where the program proceeds from the step S9 to the step S10 in FIG. 6), there is a possibility that the sensor for measuring the parameter relating to the function evaluation, that is, Os is abnormal, so that a message "there is a possibility that the sensor is abnormal" is displayed.

EXAMPLE 2

Example in which machine fails one month (T1) after it is new, similarly to Example 1

The values of the sensor parameters X, Vs and Os are as follows:

X=(0:0.9, (0, N):0.1)
Vs=(N:0.1, (N, nil):0.9)
Os=(N:0.1, (N, nil):0.9).

Furthermore, the measured value of the parameter H1 is smaller than V1. However, when (2) the effect of the amount of degradation is examined after (1) the LSIM is made, the following results are obtained:

H1=(N:1.0)
P (H1Cut)=0.9.

When (3) the SSIM is made in such a state, the values of all the parameters on the model obtained become (N:1.0).

(4) Fault judgment (a) Function evaluation of machine

N=0.1 from the fuzzy qualitative value of Os, so that N<0.5. Accordingly, the result of the function evaluation is abnormal. Consequently, a fault is diagnosed.

(5) Derivation of fault candidate

The following information are previously stored as fault candidates in the objective model storage portion 15.

H1Cut:H1=0
H1Out:H1=(0, N)
VtOut:Vt=(0, N)
PaperOut:$\zeta$=(0, N)
VbOut:Vb=(N, nil)
TonnerOut:$\gamma$0=(0, N)
MCOut:Vn=(0, N)

Meanwhile, Out means being faulty.

Figure 14:
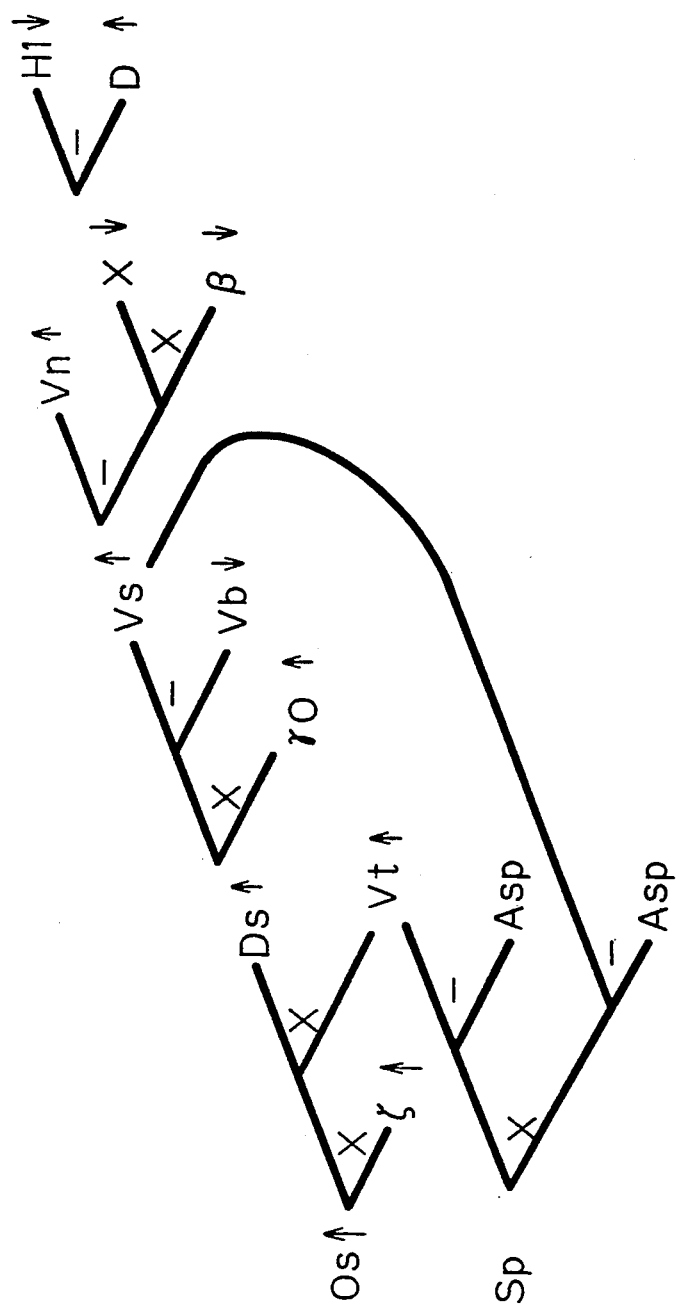
FIG. 14 is a diagram showing a state where the causes of such functional abnormality that Os is large are traced on a parameter model so as to derive a fault candidate.

Such functional abnormality that Os is large, that is, Os=(N, nil) which is found in the foregoing item (4) is traced on the parameter model shown in FIG. 10, to obtain FIG. 14. In FIG. 14, parameters marked with upward arrows are parameters whose value may be changed into (N, nil), parameters marked with downward arrows are parameters whose value may be changed into (0, N) or (0), and parameters marked with no arrows are parameters whose value remains normal.

As a result, H1Cut and H1Out out of the above described fault candidates are taken out as fault candidates.

(6) The SSIM is made with respect to the two fault candidates found in the foregoing item (5), to infer the fault state at that time. More specifically, the SSIM is made with respect to H1Out, to obtain the following two types of models:

H1=((0, N):1.0)
D=(N:1.0)
X=(0:1.0) or ((0, N):1.0)
$\beta$=(N:1.0)
Vs=((N, nil):1.0)
Yn=(N:1.0)
Vb=(N:1.0)
$\gamma$0=(N:1.0)
Ds=((N, nil):1.0)
Vt=(N:1.0)
$\zeta$=(N:1.0)
Os=((N, nil):1.0)
Asp=(N:1.0)
Sp=((N, nil):1.0).

Two types of models are obtained because X takes two types of values. The reason for this is as follows: The value of X is a value obtained by subtracting D from H1. However, H1=(0, N) and D=(N). Accordingly, if "Normal" is subtracted from "Smaller than normal", two types of cases are considered as a results of the fuzzy operation, that is, "Smaller than normal" remains or the answer becomes zero.

Furthermore, the SSIM is made with respect to H1Cut, to obtain the following two types of models:

H1=(0:1.0)
D=(N:1.0)
X=(0:1.0) or ((0, N):1.0)
$\beta$=(N:1.0)
Vs=((N. nil):1.0)
Yn=(N:1.0)
Vb=(N:1.0)
$\gamma$0=(N:1.0)
Ds=((N, nil):1.0)
Vt=(N:1.0)
$\zeta$=(N:1.0)
Os=((N, nil):1.0)
Asp=(N:1.0)
Sp=((N, nil):1.0).

(7) Specification of causes of fault

The causes of the fault are assigned priority and are narrowed down from the degree of coincidence between the model and the sensor and the degree to which a phenomenon occurs.

(i) Degree of coincidence between model and sensor

| A. | H1Out | X = 0 | B. | H1Out | X = (0, N) |
|---|---|---|---|---|---|
| | X | 0.9 | | X | 0.1 |
| | Vs | 0.9 | | Vs | 0.9 |
| | Os | 0.9 | | Os | 0.9 |
| | whole | 0.9 | | whole | 0.63 |
| C. | H1Cut | X = 0 | D. | H1Cut | X = (0, N) |
| | X | 0.9 | | X | 0.1 |
| | Vs | 0.9 | | Vs | 0.9 |
| | Os | 0.9 | | Os | 0.9 |
| | Whole | 0.9 | | whole | 0.63 |

The degree of coincidence between the model obtained as a result of making the SSIM with respect to each of the fault candidates in the item (6) and the sensor is found as described above.

The model obtained in the item (6) is a parameter model on which the causes of the fault (for example, H1=((0, N) 1.0) for H1Out) are set and the effect of the causes of the fault on the other parameters is traced. Consequently, the higher the degree of coincidence between the value of the sensor paid attention to and the value of a parameter corresponding thereto on the model is, the closer the present state of the objective machine is to the model. In other words, the possibility that the causes of the fault assumed so as to derive the model are the present causes of the fault is high.

In the present embodiment, the degrees of coincidence between the models with respect to H1Out and H1Cut and the sensor are simultaneously 0.9, so that H1Out and H1Cut are both considered as the causes of the fault.

The above described four models are assigned priority as follows:

Priority 1. A, C:0.9
2. B,D:0.63

The priority of the causes of the fault may be previously stored in the objective model storage portion 15 shown in FIG. 3 or the like when a plurality of causes are thus derived, to narrow down the causes of the fault in accordance with the priority. In the present embodiment, the following operation is performed so as to further narrow down the causes of the fault.

(ii) Degree to which phenomenon occurs

The causes of the fault are narrowed down by multiplying the value indicating the degree of coincidence by the value indicating the degree to which there occurs a phenomenon which is derived in the stage in which the effect of the amount of degradation obtained in the item (2) is examined, as described below:

p (H1Out)=1
p (H1Cut)=0.9
Priority 1. A:0.9×1.0=0.9 1.0 when normalized
2. C:0.9×0.9=0.81 0.9 when normalized
3. B:0.63×1.0=0.63 0.7 when normalized
4. D:0.63×0.9=0.57 0.63 when normalized.

The highest calculated value of (degree of coincidence)×(degree) is assigned the highest priority. Accordingly, it is found that H1Out is most doubtful. Therefore, such a repair is made as to change the quantity of light of the halogen lamp.

EXAMPLE 3

Example in which machine is degraded n months (nT1) after it starts to be used

The fuzzy qualitative values of the respective parameters are found as follows from the measured values obtained from the sensor:

H1=(m:1.0) from H1=V1
T=(m:0.3, 1:0.7) from T=nT2.

In addition, the values of the sensor parameters are as follows:

X=(N:0.8, (0, N):0.2)
Vs=(N:0.9, (N, nil):0.1)
Os=(N:0.9, (N, nil):0.1)

(1) Forecast of the present degraded state by LSIM

The initial conditions are as follows:

XXn−1=(m:1.0).

In addition, coefficients previously set are as follows:

$\alpha$1=(S:1.0)
$\alpha$2=(m:1.0).

From FIG. 13 and the tables 4 (A) and (B), the following results are obtained:

```
     dXX1 = (s: 1.0)
     dXX2 = (m 0.3, 1: 0.7)
   ∴ dXX  = (s: 1.0) + (m: 0.3, 1: 0.7)
          = (m: 0.3, 1: 0.7)
       XX = (m: 1.0) + (m: 0.3, 1: 0.7)
          = (m: 0.3, 1: 0.7).
```

(2) Examination of effect of amount of degradation

Calculation is performed by applying the amount of degradation XX found in the foregoing item (1) to the table 3, to obtain the following results:

```
        H1 = ((N: 0.95, (0, N): 0.05): 0.3)
             ((N: 0.9, (0, N): 0.1): 0.7))
           = N: 0.95 × 0.3 + 0.9 × 0.7
             (0, N): 0.05 × 0.3 + 0.1 × 0.7
           = (N: 0.915, (0, N): 0.085).
   p (H1Cut) = 1.1 × 0.3 + 1.3 × 0.7
             = 1.24.
```

(3) Inference of present state of entire machine using result of LSIM by SSIM

From the result in the foregoing item (2) and the initial conditions, the following results are obtained:

H1=(N:0.915, (0, N):0.085)
D=(N:1.0)
$\beta$=(N:1.0)
Vn=(N:1.0)
Vb=(N:1.0)
$\gamma$0=(N:1.0)
Vt=(N:1.0)
$\zeta$=(N:1.0)
Asp=(N:1.0).

The SSIM is made under the conditions, to obtain the following results:

H1=(N:0.915, (0, N):0.085)
D=(N:1.0)
X=(N:0.915, (0, N):0.085) or (N:0.915, 0:0.085)
$\beta$=(N:1.0)
Vs=(N:0.915, (N, nil):0.085)
Vn=(N:1.0)
Vb=(N: 1.0)
$\gamma$0=(N:1.0)
Ds=(N:0.915, (N, nil):0.085)
Vt=(N:1.0)
$\zeta$=(N:1.0)
Os=(N:0.915, (N, nil):0.085)
Asp=(N:1.0)
Sp=(N:0.915, (N, nil):0.085).

The results indicate that an image may be high in density as the effect of the degradation of HI (Os is raised). In addition, the combined effect of the degradation of a plurality of components and consequently, faults serially occurring can be generally inferred from the changes in value of the parameters.

(4) Fault judgment (a) Function evaluation of machine

N=0.9 from the fuzzy qualitative value of Os, so that N≧0.5. Accordingly, the result of the function evaluation is normal.

(b) Comparison between value on model and measured value

Each of the sensor values and the value on the model obtained as the result in the foregoing item (3) are compared with each other, to find the degree of coincidence therebetween.

A. Model of X=(N:0.915, (0, N):0.085)

|  |  |
|---|---|
| X | 0.8 |
| Vs | 0.8 |
| Os | 0.8 |
| whole | 0.87 |

B. Model of X=(N:0.915, 0:0.085)

|  |  |
|---|---|
| X | 0.8 |
| Vs | 0.9 |
| Os | 0.9 |
| whole | 0.87 |

Accordingly, it is found that the sensor value possibly coincides with the value on the model A or B. In conclusion, it is judged that the result of the function evaluation of the machine is normal, so that the machine can be normally used, through it is degraded to be brought into the state of the model A or B.

EXAMPLE 4

Case where fault occurs under same conditions as Example 3

The following data are obtained as sensor values:
X=(N:0.1, (0, N):0.9)
Vs=((N:nil):1.0)
Os=((N:nil):1.0).

Furthermore, when the operation is executed from the values of H1 and T, the same results as those in the items (1) to (3) in the above described example 3 are obtained.

(4) Fault judgment (a) Function evaluation of machine

N=0 from the fuzzy qualitative value of Os, so that N<0.5. Accordingly, the result of the function evaluation is abnormal. Consequently, it is judged that the machine fails.

(5) Derivation of fault candidate

Fault candidates previously stored are the same as those described in the foregoing item (5) in the example 2. Therefore, Os=(N, nil) is traced on the parameter model shown in FIG. 10, to obtain H1Cut and H1Out as fault candidates.

(6) Fault simulation by SSIM

The same results as those in the item (6) in the example 2 are obtained with respect to H1Cut and H1Out.

In the present embodiment, description is made considering that only an exposure portion is degraded for simplification. Accordingly, the results of the fault simulation in this example 4 are the same as those in the example 2. However, the same results are not generally obtained because the values of the other parameters are changed by the effect of the degradation. For example, when $\zeta$=(N:0.8, (0, N): 0.2) as the effect of the degradation of the output portion, the following results are obtained with respect to H1Out:

H1=((0, N):1.0)
D=(N:1.0)
X=((0, N):1.0) or (0:1.0)
$\beta$=(N:1.0)
Vs=((N, nil):1.0)
Vn=(N:1.0)
Vb=(N:1.0)
$\gamma$0=(N:1.0)

Ds=((N, nil):1.0)
Vt=(N:1.0)
ζ=(N:0.8, (0, N):0.2)
Os=((0, N):0.2, N:0.2, (N, nil):0.8) ((0, N):0.18, N:0.18, (N, nil):0.8) when normalized
Asp=(N:1.0)
Sp=((N, nil):1.0).

(7) Specification of causes of fault

The causes of the fault are assigned priority and are narrowed down from the degree of coincidence between the model and the sensor and the degree to which a phenomenon occurs.

(i) Degree of coincidence between model and sensor

| A. | H1Out | X = 0 | B. | H1Out | X = (0, N) |
|---|---|---|---|---|---|
| | X | 0.9 | | X | 0.1 |
| | Vs | 1.0 | | Vs | 1.0 |
| | Os | 1.0 | | Os | 1.0 |
| | whole | 0.97 | | whole | 0.7 |
| C. | H1Cut | X = 0 | D. | H1Cut | X = (0, N) |
| | X | 0.9 | | X | 0.1 |
| | Vs | 1.0 | | Vs | 1.0 |
| | Os | 1.0 | | Os | 1.0 |
| | whole | 0.97 | | whole | 0.7 |
| Priority | 1. A, C: 0.97 | | | | |
| | 2. B, D: 0.7 | | | | |

(ii) Degree to which phenomenon occurs
p (H1Out)=1
p (H1Cut)=1.24
Priority 1. C:0.97×1.24=1.20 1.0 when normalized
2. A:0.97×1.0=0.97 0.81 when normalized
3. D:0.7×1.24=0.87 0.73 when normalized
4. B:0.7×1.0=0.7 0.58 when normalized.

Accordingly, C is most doubtful. In addition, at least H1Cut is doubtful. However, H1Cut means that the halogen lamp is cut off and the repair cannot be made, so that the repair is not made.

Meanwhile, it can be judged by dividing the causes of the fault into the causes of the fault which can be repaired and the causes of the fault which cannot be repaired, storing the causes of the fault in the objective model storage portion 15 shown in FIG. 3, and suitably referring to the causes the fault whether the causes of the fault can be repaired. In addition, when the cause of the fault which cannot be repaired is derived as the highest priority one, a message "the repair cannot be made" may be displayed on the display portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus provided with self-diagnosis and self-repair capability, said apparatus including a plurality of functional elements for together performing an image forming function, each of said plurality of functional elements including at least one component, said apparatus comprising:

objective model storage means for storing (i) qualitative data qualitatively representing, using parameters, behaviors or attributes of respective functional elements of said apparatus and relationships between said functional elements, (ii) first membership functions corresponding to said parameters, (iii) fault diagnosis knowledge., and (iv) reference values for fault judgement;

degradation data storage means for storing degradation data for a predetermined one of said components, said degradation data including degradation factors and second membership functions corresponding to said degradation factors;

sensor means for sensing a functional state of a predetermined functional element of said image forming apparatus and outputting state data indicative of a sensed functional state;

actuator means for changing the functional state of at least one of said functional elements;

degradation amount calculation means for calculating an amount of degradation undergone by said one predetermined component over the time of use of said image forming apparatus on the basis of state data sensed by said sensor means to obtain a calculated amount of degradation, and for representing said calculated amount of degradation by a fuzzy qualitative value by using said second membership functions;

change calculation means for changing a value of a parameter of qualitative data on the basis of an amount of degradation calculated by said degradation amount calculation means to obtain a changed value for said parameter of qualitative data, and for converting said changed value to a fuzzy qualitative value by using one of said first membership functions, said one of said first membership functions being a membership function corresponding to said parameter which has been changed by said change calculation means, said change calculation means outputting said fuzzy qualitative value;

data conversion means for converting state data output by said sensor means into a fuzzy qualitative state data value using said first membership functions;

fault judgement means for judging whether or not a fault exits in said image forming apparatus by comparing a fuzzy qualitative state data value output from said data conversion means with said reference values for fault judgement stored in said objective model storage means;

fault diagnosis means, responsive to judgment of an existence of a fault by said fault judgement means, for diagnosing the condition of said image forming apparatus on the basis of said qualitative data, said first membership functions, and fault diagnosis knowledge stored in said objective model storage means by utilizing a fuzzy qualitative value output by said change calculation means as an initial condition of said image forming apparatus, and for outputting a diagnosis as an expression including ambiguity;

cause specification means for specifying a fault cause by comparing a fuzzy qualitative state data value obtained from said data conversion means with a condition of said image forming apparatus as indicated by an expression outputted by said fault diagnosis means; and repair means for operating said actuator means to remove the fault cause specified by said cause specification means.

2. An image forming apparatus according to claim 1, wherein said repair means includes repair judgement means for judging whether a fault cause is removable or not on the basis of a fault cause specified by said cause specification means; and means for operating said actuator means only when it is judged by said repair judgement means that the cause is removable.

3. An image forming apparatus according to claim 1, wherein said objective model storage means further stores a reference value corresponding to occurrence of a fault, and said change calculation means calculates a degree of occurrence of a fault in said image forming apparatus based on a degradation amount calculated by said degradation amount calculation means.

4. An image forming apparatus according to claim 3, wherein said cause specification means specifies a fault cause based upon a degree of fault occurrence as calculated by said change calculation means.

5. An image forming apparatus according to claim 3, wherein said repair means includes repair judgement means for judging whether a fault cause is removable or not on the basis of a fault cause specified by said cause specification means; and means for operating said actuator means only when it is judged by said judgement means that the cause is removable.

6. A self-diagnosis system for an image forming apparatus which generates a visible image with image data, said apparatus including a plurality of functional elements for together performing an image forming function, each of said plurality of functional elements including at least one component, said system comprising:

objective model storage means for storing (i) qualitative data qualitatively representing, using parameters, behaviors or attributes of respective functional elements of said apparatus and relationships between said functional elements, (ii) first membership functions corresponding to said parameters, (iii) fault diagnosis knowledge, and (iv) reference values for fault judgement;

degradation data storage means for storing degradation data for a predetermined one of said components, said degradation data including degradation factors and second membership functions corresponding to said degradation factors;

data input means for inputting condition data;

degradation amount calculation means for calculating an amount of degradation undergone by one of said predetermined components over the time of use of said image forming apparatus on the basis of condition data input by said data input means to obtain a calculated amount of degradation, and for representing said calculated amount of degradation by a fuzzy qualitative value by using said second membership functions;

change calculation means for changing a value of a parameter of qualitative data on the basis of the amount of degradation calculated by said degradation amount calculation means to obtain a changed value for said parameter of qualitative data, and for converting said changed value to a fuzzy qualitative value by using one of said first membership functions, said one of said first membership functions being a membership function corresponding to said parameter which has been changed by said change calculation means, said change calculation means outputting said fuzzy qualitative value;

data conversion means for converting condition data from said data inputting means into a fuzzy qualitative condition value using said first membership functions;

fault judgment means for judging whether or not a fault exists in said image forming apparatus by comparing a fuzzy qualitative condition value output from said data conversion means with said reference values for fault judgement stored in said objective model storage means;

fault diagnosis means, responsive to judgment of an existence of a fault by said fault judgment means, for diagnosing the condition of said image forming apparatus on the basis of said qualitative data, said first membership functions, and said fault diagnosis knowledge stored in said objective model storage means by utilizing a fuzzy qualitative value output by said change calculation means as an initial condition of said image forming apparatus, and for outputting a diagnosis as an expression including ambiguity; and cause specification means for specifying a fault cause by comparing a fuzzy qualitative condition value obtained from said data conversion means with a condition of said image forming apparatus as indicated by an expression output by said fault diagnosis means.

7. A self-diagnosis system according to claim 6, wherein said objective model storage means further stores a reference value corresponding to occurrence of a fault, and said change calculation means calculates a degree of occurrence of a fault in said image forming apparatus by said degradation amount calculated by said degradation amount calculation means.

8. A self-diagnosis system according to claim 7, wherein said cause specification means specifies a fault cause based upon fault occurrence as calculated by said change calculation means.

9. An image forming apparatus provided with self-diagnosis capability, said apparatus including a plurality of functional elements for together performing an image forming function, each of said plurality of functional elements including at least one component, said apparatus comprising:

objective model storage means for storing (i) qualitative data qualitatively representing, using parameters, behaviors or attributes of respective functional elements of said apparatus and relationships between said elements, (ii) first membership functions corresponding to said parameters, (iii) fault diagnosis knowledge, and (iv) reference values for fault judgement;

degradation data storage means for storing degradation data for a predetermined one of said components, said degradation data including degradation factors and second membership functions corresponding to said degradation factors;

sensor means for sensing a functional state of a predetermined functional element of said image forming apparatus and outputting state data indicative of a sensed functional state;

degradation amount calculation means for calculating an amount of degradation undergone by said one predetermined component over the time of use of said image forming apparatus on the basis of state data sensed by said sensor means to obtain a calculated amount of degradation, and for representing said calculated amount of degradation by a fuzzy qualitative value by using said second membership functions;

change calculation means for changing a value of a parameter of qualitative data on the basis of the amount of degradation calculated by said degradation amount calculation means to obtain a-changed value for said parameter of qualitative data, and for converting said changed value to a fuzzy qualitative value by using one of said first membership functions, said one of said first membership functions being a membership function corresponding to said parameter which has been changed by said change calculation means, said change calculation means outputting said fuzzy qualitative value;

data conversion means for converting state data output by said sensor means into a fuzzy qualitative state data value using said first membership functions;

fault judgment means for judging whether or not a fault exists in said image forming apparatus by comparing a fuzzy qualitative state data value output from said data conversion means with said reference values for fault judgement stored in said objective model storage means;

fault diagnosis means, responsive to judgement of an absence of a fault by said fault judgement means, for applying calculation results from said change calculation means to qualitative data stored in said objective model storage means by utilizing a fuzzy qualitative value calculated by said change calculation means as an initial condition of said image forming machine, and determining a fuzzy qualitative value for each parameter;

informing means for comparing a fuzzy qualitative state data value output from said data conversion means and a fuzzy qualitative value determined by said fault diagnosis means and informing when said fuzzy qualitative state data value and said determined fuzzy qualitative value do not have a fixed degree of consistency.

10. An image forming apparatus provided with self-diagnosis and self-repair capability, said apparatus including a plurality of functional elements for together performing an image forming function, each of said plurality of functional elements including at least one component, said apparatus comprising:

storage means for storing (i) qualitative data qualitatively representing, using parameters, behaviors or attributes of respective functional elements of said apparatus and relationships between said functional elements, (ii) first membership functions corresponding to said parameters, (iii) fault diagnosis knowledge, (iv) reference values for fault judgement, and (v) degradation data for a predetermined one of said components, said degradation data including degradation factors and second membership functions corresponding to said degradation factors;

sensor means for sensing a functional state of said image forming apparatus and outputting state data indicative of a sensed functional state, said sensor means sensing a functional state of at least a predetermined functional element of said apparatus;

data conversion means for converting state data output by said sensor means into a fuzzy qualitative state data value using said first membership functions;

actuator means for changing the functional state of at least one of said functional elements;

long-term simulation means, said long-term simulation means (a) simulating an amount of degradation undergone by said one predetermined component over a time of use of said image forming apparatus on the basis of fuzzy qualitative state values provided by said conversion means to obtain a simulated amount of degradation, (b) representing said simulated amount of degradation by a fuzzy qualitative degradation value by using said second membership functions, and (c) calculating a changed value of a parameter of the qualitative data for a functional element of said image forming apparatus on the basis of said fuzzy qualitative degradation value to obtain a changed value for said parameter of the qualitative data, short-term simulation means receiving a changed value from said long-term simulation means and simulating a present state model of said apparatus;

fault diagnosis means for determining whether or not a fault exits in said image forming apparatus by comparing a fuzzy qualitative state data value output from said data conversion means with said reference values for fault judgement stored in said objective model storage means, said fault diagnosis means obtaining a fault candidate based upon said fault diagnosis knowledge upon determining that a fault exits;

said short-term simulation means being responsive to the determination of the existence of a fault by said fault diagnosis means for providing another state model of said image forming apparatus on the basis of a fault candidate obtained by said fault diagnosis means, said qualitative data, said first membership functions, and fault diagnosis knowledge stored in said objective model storage means by utilizing a fuzzy qualitative value output by said long-term simulation means as an initial condition of said image forming apparatus;

said fault diagnosis means specifying a fault cause by comparing a fuzzy qualitative state data value obtained from said data conversion means with said another state model of said image forming apparatus provided by said short-term simulation means; and repair means for operating said actuator means to remove the fault cause specified by said fault diagnosis means.

* * * * *